(12) United States Patent
Sakoda et al.

(10) Patent No.: US 9,565,589 B2
(45) Date of Patent: Feb. 7, 2017

(54) INFORMATION DISTRIBUTION SYSTEM AND METHOD, TERMINAL APPARATUS, SERVER APPARATUS, DATA RECEPTION METHOD, AND DATA TRANSMISSION METHOD

(71) Applicant: Sony Corporation, Tokyo (JP)

(72) Inventors: Kazuyuki Sakoda, Tokyo (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 27 days.

(21) Appl. No.: 13/869,265

(22) Filed: Apr. 24, 2013

(65) Prior Publication Data

US 2013/0272122 A1    Oct. 17, 2013

Related U.S. Application Data

(60) Continuation of application No. 12/606,693, filed on Oct. 27, 2009, now Pat. No. 8,442,055, which is a
(Continued)

(30) Foreign Application Priority Data

Feb. 9, 1999    (JP) .................................... 11-032065

(51) Int. Cl.
  *H04W 28/02*    (2009.01)
  *H04L 12/14*    (2006.01)
  *H04L 29/08*    (2006.01)

(52) U.S. Cl.
  CPC .......... *H04W 28/0289* (2013.01); *H04L 12/14* (2013.01); *H04L 12/1485* (2013.01);
(Continued)

(58) Field of Classification Search
  CPC ........................... H04L 67/322; H04W 28/028
(Continued)

(56) References Cited

U.S. PATENT DOCUMENTS

| 4,486,773 A | 12/1984 | Okubo |
| 4,905,080 A | 2/1990 | Watanabe et al. |

(Continued)

FOREIGN PATENT DOCUMENTS

| EP | 0 849 920 | 6/1998 |
| JP | 1-312663 | 12/1989 |

(Continued)

*Primary Examiner* — Brian D Nguyen
*Assistant Examiner* — Toan Nguyen
(74) *Attorney, Agent, or Firm* — Wolf, Greenfield & Sacks, P.C.

(57) ABSTRACT

An information distribution system and method capable of averaging a traffic load over time and effectively utilizing communication facilities, wherein a terminal station 30 transmits to a contents server 10 a distribution request for desired information including information of time limit of distribution, and the contents server 10 receives the distribution request, estimates a time band where the traffic load is small in the communications system in the period until the time limit of distribution, pages the terminal station again at that period of time, and, if the terminal station is in a state able to receive the information content, transmits the requested information content to the terminal station 30 through a network node.

20 Claims, 7 Drawing Sheets

Related U.S. Application Data division of application No. 09/647,964, filed as application No. PCT/JP00/00705 on Feb. 9, 2000, now Pat. No. 7,633,945.

(52) U.S. Cl.
CPC .......... H04L 67/322 (2013.01); H04L 67/325 (2013.01); H04L 69/329 (2013.01)

(58) Field of Classification Search
USPC .......... 370/230, 395.21, 395.42, 235, 395.4; 725/58, 1
See application file for complete search history.

(56) References Cited

U.S. PATENT DOCUMENTS

| | | | |
|---|---|---|---|
| 5,465,385 A * | 11/1995 | Ohga et al. ................. 725/58 |
| 5,465,392 A | 11/1995 | Baptist et al. |
| 5,493,695 A | 2/1996 | Aikenhead et al. |
| 5,524,021 A | 6/1996 | Scotton et al. |
| 5,539,450 A * | 7/1996 | Handelman ................. 725/1 |
| 5,631,693 A * | 5/1997 | Wunderlich ......... H04N 7/1675 348/E7.056 |
| 5,751,708 A | 5/1998 | Eng et al. |
| 5,764,899 A | 6/1998 | Eggleston et al. |
| 5,794,140 A * | 8/1998 | Sawyer ................. 455/408 |
| 5,815,194 A | 9/1998 | Ueda |
| 5,892,535 A | 4/1999 | Allen et al. |
| 5,913,039 A | 6/1999 | Nakamura et al. |
| 5,920,701 A * | 7/1999 | Miller .................. H04L 1/1614 709/228 |
| 5,999,526 A | 12/1999 | Garland et al. |
| 6,295,285 B1 | 9/2001 | Whitehead |
| 6,401,243 B1 | 6/2002 | Suzuki |
| 6,412,004 B1 | 6/2002 | Chen et al. |
| 6,510,556 B1 * | 1/2003 | Kusaba et al. .................. 725/93 |
| 6,553,178 B2 | 4/2003 | Abecassis |
| 6,571,391 B1 | 5/2003 | Acharya et al. |
| 7,024,681 B1 | 4/2006 | Fransman et al. |

FOREIGN PATENT DOCUMENTS

| | | |
|---|---|---|
| JP | 4-94242 | 3/1992 |
| JP | 7-307760 | 11/1995 |
| JP | 9-307564 | 11/1997 |
| JP | 10-039959 | 2/1998 |

* cited by examiner

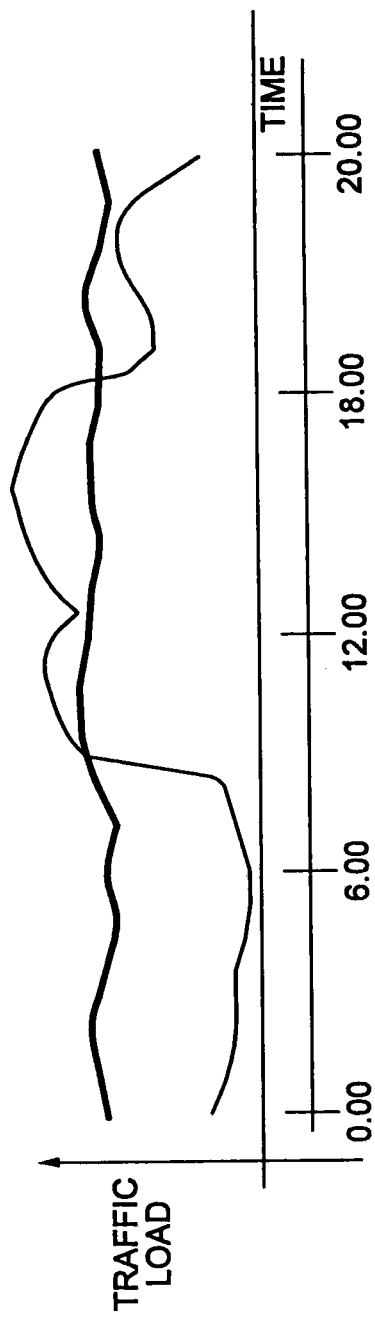

INFORMATION DISTRIBUTION SYSTEM AND METHOD, TERMINAL APPARATUS, SERVER APPARATUS, DATA RECEPTION METHOD, AND DATA TRANSMISSION METHOD

This is a Continuation of application Ser. No. 12/606,693, filed on Oct. 27, 2009, now U.S. Pat. No. 8,442,055, which is a Divisional of application Ser. No. 09/647,964, filed on Jan. 8, 2001, now U.S. Pat. No. 7,633,945. Application Ser. No. 09/647,964 is the U.S. National Stage of International Application No. PCT/JP00/00705, filed on Feb. 9, 2000, and claims priority to Japanese Patent Application No. 11-032065, filed Feb. 9, 1999. The entire contents of these applications are incorporated herein by reference.

TECHNICAL FIELD

The present invention relates to an information distribution system and method, a terminal apparatus, a server apparatus, a data reception method, and a data transmission method able to be applied to a network system such as a cellular wireless communication system and particularly capable of averaging a traffic load over time and efficiently utilizing a communication infrastructure.

BACKGROUND ART

As an example of a general communication system for distributing information in the related art, web browsing over the Internet can be mentioned.

A communication procedure in web browsing of the related art is shown in FIG. 1.

In this procedure, when a terminal station sends a demand for provision of information (demand for content) to a contents server, the contents server immediately responds to this and transmits the requested information content (requested content) to the terminal station.

In the above communication system, however, since it is based on real-time communication immediately responding to a request for providing information, for example as shown in FIG. 2, the traffic load widely varies such as with the amount sharply increasing during a certain time band and oppositely the amount largely decreasing during a time band, for example, at the night.

Accordingly, it suffers from the disadvantage that communication facilities are not in use during the night time and other time bands when the communication traffic is low, so the communication facilities are not efficiently used.

Further, it suffers from the disadvantage of the difficulty in sufficient improvement of the efficiency of utilization of the communication facilities because a network operator often determines a traffic load of a communication system in order to provide an acceptable quality of service during the time bands when the traffic load is large.

DISCLOSURE OF THE INVENTION

An object of the present invention is to provide an information distribution system and method capable of averaging a traffic load over time and efficiently utilizing communication facilities.

Another object of the present invention is to provide an (a) terminal apparatus, (b) server apparatus, (c) data reception method, and (d) data transmission method used for such an information distribution system and capable of contributing to the averaging of the traffic load in the network and efficient utilization of communication facilities.

According to a first aspect of the present invention, there is provided an information distribution system transmitting information based on a demand from a terminal apparatus from a server apparatus to the terminal apparatus, wherein said server apparatus comprises a first transceiver for transmission to the terminal apparatus and a first controller for scheduling a point of time for distribution based on a state of a communication line used for distribution of information in accordance with a request signal requesting information from the terminal apparatus received at said transceiver and controlling the system for distribution of information for said request signal to the terminal apparatus through the transceiver at the scheduled point of time and said terminal apparatus comprises a second transceiver for communication with a server apparatus and a second controller for generating a request signal for requesting the distribution of desired information, controlling the system for transmission of the requested information to said server through said second transceiver, and controlling the system for reception of said information distributed by said server apparatus in a period of time determined by said server apparatus with respect to said request signal.

According to a second aspect of the present invention, there is provided a terminal apparatus receiving distribution of information from a server apparatus, said terminal apparatus receiving distribution of information from a server apparatus comprising a transceiver for transmission to the server apparatus and a controller for generating a request signal for requesting the distribution of desired information, controlling the system for transmission of the requested information to said server through said transceiver, and controlling the system for reception of said information distributed by said server apparatus in a period of time determined by said server apparatus with respect to said request signal.

According to a third aspect of the present invention, there is provided a server apparatus transmitting information based on a demand from a terminal apparatus, said server apparatus transmitting information based on a demand from a terminal apparatus comprising a transceiver for transmission to the terminal apparatus and a controller for scheduling a point of time for distribution based on a state of a communication line used for distribution of information in accordance with a request signal requesting information from the terminal apparatus received at said transceiver and controlling the system for distribution of information for said request signal to the terminal apparatus through the transceiver at the scheduled point of time.

According to a fourth aspect of the present invention, there is provided an information distribution method for transmitting information based on a request from a terminal apparatus from a server apparatus to the terminal apparatus, said information distribution method for transmitting information based on a request from a terminal apparatus from a server apparatus to the terminal apparatus comprising the steps of having said terminal apparatus generates a request signal requesting distribution of desired information; transmitting said request signal from said terminal apparatus to said server; having said server apparatus schedule a point of time for distribution based on a state of a communication line to be used for the distribution of information in accordance with a request signal requesting information from said terminal apparatus; distributing information for said request signal from said server apparatus to said terminal apparatus at the scheduled point of time; and having said terminal apparatus receive said information distributed from said server apparatus.

According to a fifth aspect of the present invention, there is provided a data reception method for receiving distribution of information from a server apparatus, said data reception method for receiving distribution of information from a server apparatus comprising the steps of generating a request signal requesting distribution of desired information; transmitting said requested information to said server; and receiving said information distributed by said server apparatus in a period of time determined by said server apparatus for said request signal.

According to a sixth aspect of the present invention, there is provided a data transmission method for transmitting information based on a request from a terminal apparatus, said data transmission method for transmitting information based on a request from a terminal apparatus comprising the steps of receiving a request signal requesting information from a terminal apparatus; scheduling a point of time for distribution based on a state of a communication line used for distribution of information; and transmitting the information for the request signal to the terminal apparatus at the scheduled point of time.

BRIEF DESCRIPTION OF THE DRAWINGS

FIG. 7 is a view of fluctuations in a traffic load over a day in the cellular wireless communication system shown in FIG. 3.

BEST MODE FOR CARRYING OUT THE INVENTION

First Embodiment

An embodiment of the present invention will be explained with reference to FIGS. 3 to 7.

In the present embodiment, the present invention will be explained by giving as an example a cellular wireless communication system.

First, the network configuration of a cellular wireless communication system of the present embodiment will be explained with reference to FIG. 3.

Figure 1:
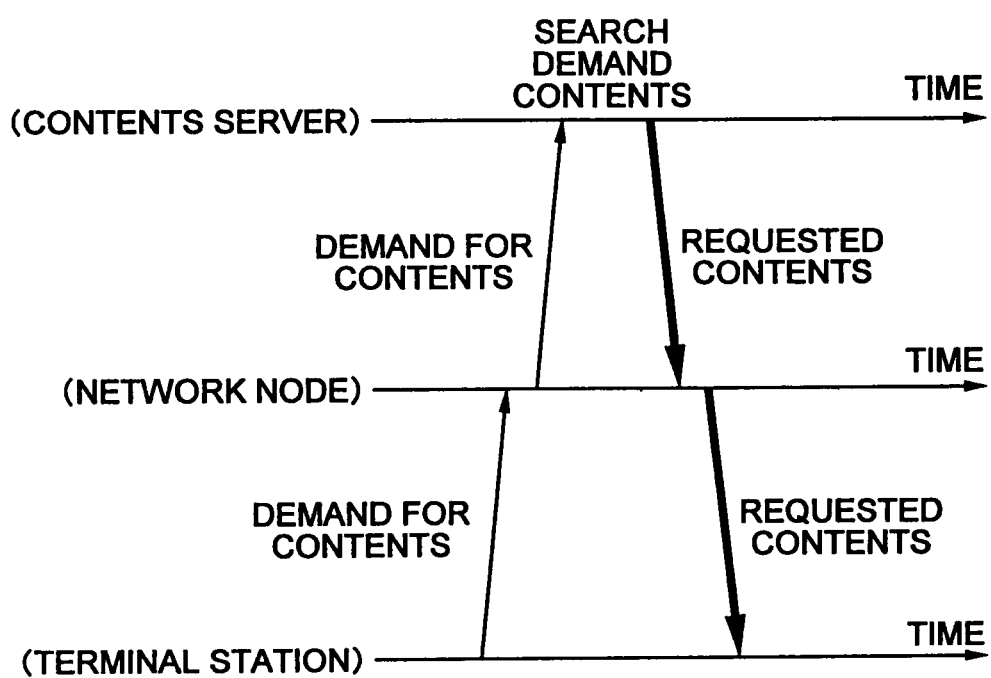
FIG. 1 is a view of a communication procedure in a communication system for performing conventional general information distribution.
Figure 2:
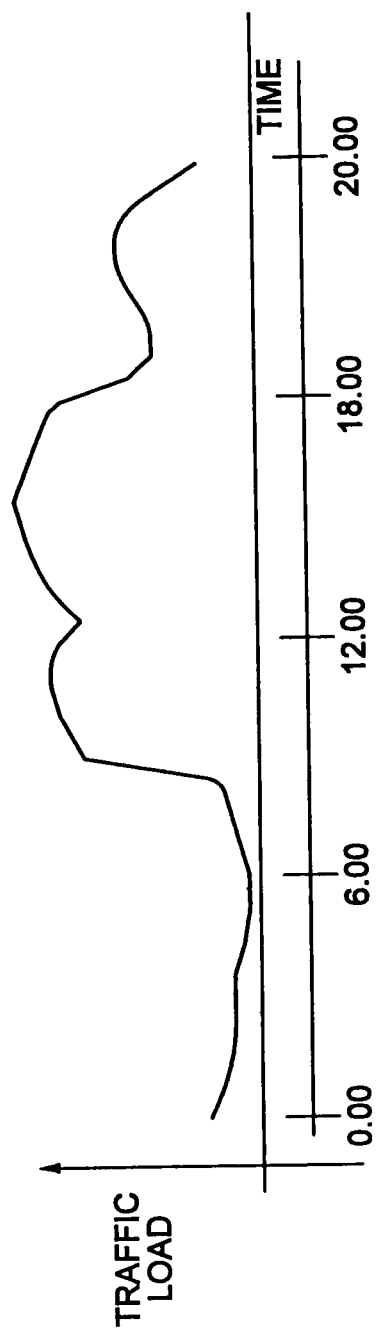
FIG. 2 is a view of fluctuations in a traffic load over a day in a conventional general communication system.
Figure 3:
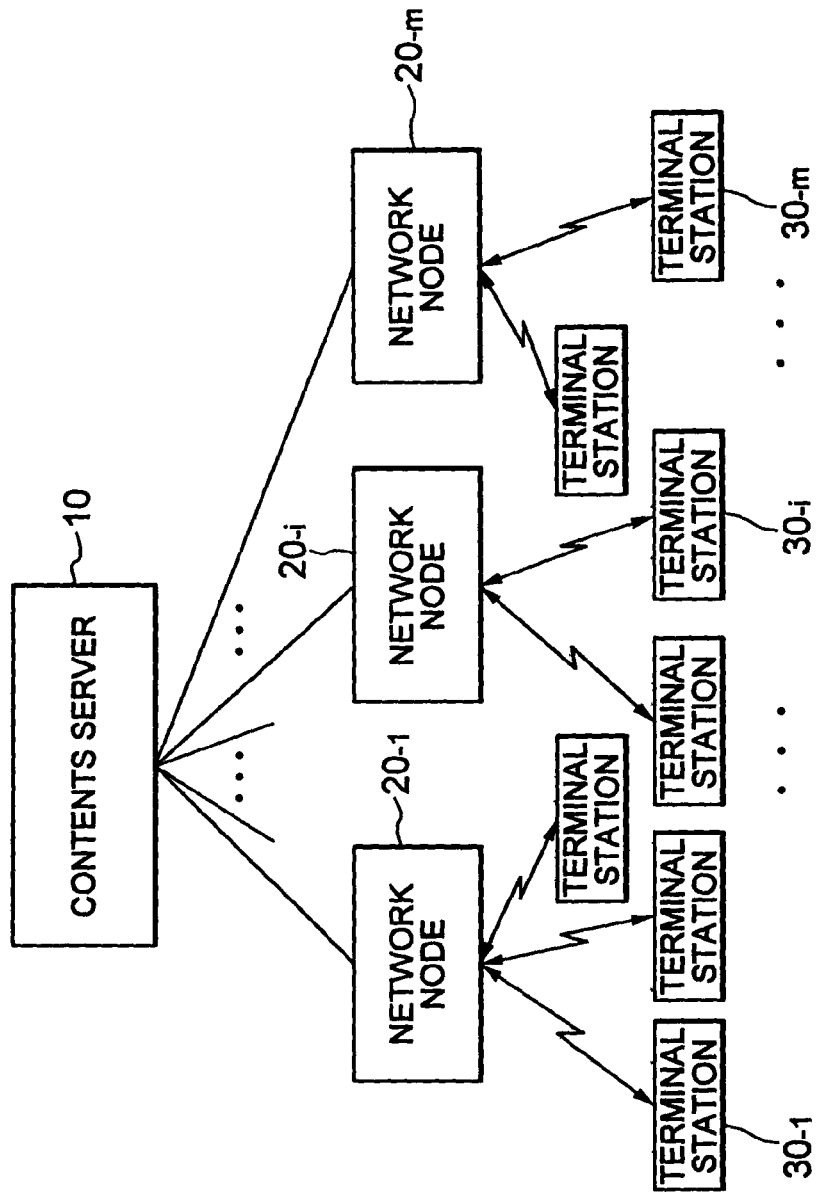
FIG. 3 is a view of a network configuration of a cellular wireless communication system of as embodiment of the present invention.

FIG. 3 is a view of the network configuration of the cellular wireless communication system of the present embodiment.

A cellular wireless communication system 1 of the present embodiment has the configuration of arranging in layers as shown in the figures a contents server 10, a plurality of network nodes $20_{-1}$ to $20_{-n}$, and a plurality of terminal stations $30_{-1}$ to $30_{-m}$. Information is transmitted from the contents server 10 to the respective terminal stations $30_{-j}$ (j=1 to m) via the network nodes $20_{-i}$ (i=1 to n).

In the cellular wireless communication system 1, the network nodes $20_{-1}$ to $20_{-n}$ correspond to an MTSO (Mobile Telephone Switching Office) or a wireless base station CS (Cell Site) etc. Therefore, communication between the network nodes $20_{-i}$ (i=1 to n) and the terminal stations $30_{-j}$ is maintained by the control carried out in an existing cellular wireless communication system.

The parts of the cellular wireless communication system 1 will be explained in further detail below.

The contents server 10 is a server apparatus storing desired information to be distributed and suitably distributes it in accordance with requests. The contents server 10 is specifically configured by, for example, a work station and a file server apparatus having a communication interface.

The contents server 10 has a processing module for realizing functions related to information distribution described below and thereby performs desired processing.

First, the contents server 10 receives a distribution request of any information transmitted from the respective terminal stations $30_{-j}$ of the cellular wireless communication system 1 shown in FIG. 3. The distribution request includes contents information for specifying information requested, terminal information for specifying a terminal station $30_{-j}$ and time limit information indicating a time limit of distribution. When receiving a distribution request, the contents server 10 judges whether or not it has the information requested and judges whether it is possible to distribute the information before the time indicated by the time limit information and thereby detects whether it can respond to the distribution request and notifies the results to the terminal station $30_{-j}$.

Further, when it is found to be possible to distribute the desired information by this, the server refers to the information of the traffic load of the network estimated and stored in advance to calculate the period of time where the traffic load of the network is small and thereby determines the period of time for distribution of the information, notifies this to the terminal station $30_{-j}$, and stores this as a distribution schedule in the contents server 10.

Then, the contents server 10 successively distributes the information to the terminal station $30_{-j}$ in accordance with this stored distribution schedule.

Further, at the time of the information distribution, the contents server 10 performs processing for charging the respective terminal stations $30_{-j}$ for the distribution of information. The charge for the distributed information is determined by a variety of conditions such as the type or amount of the distributed information, the content of contracts for the information distribution service, the distribution areas, and distribution time bands. Also, in the present embodiment, it is determined by whether there is freedom of selection of the time limit of distribution based on a designated distribution time limit, usage conditions of communication resources based on a positional relationship with the terminal base station of a terminal station $30_{-j}$, etc.

Also, the contents server 10, regardless of existence of a distribution request, suitably detects a communication state of the network system 1, that is, a traffic load (traffic load), and estimates a traffic load for different time bands.

Also, the server sets the communication expenses for when distributing information based on the estimated traffic load. The communication expenses is set by for example region, by time bands, by time bands for individual regions, etc.

Information of the estimated traffic load, communication expenses, etc. is stored in the contents server 10 and referred to at the time of determining the distribution period of the requested information. In addition, in some cases, it is transmitted to the terminal station $30_{-j}$ in advance and referred to at the time when a user requests distribution.

The network nodes $20_{-i}$ are relay devices for substantially connecting the contents server 10 and the terminal stations $30_{-j}$ in accordance with a predetermined network topology. In FIG. 3, the layer of the network nodes $20_{-i}$ forming the relay layer is made one layer for simplifying the figure, however, in an actual cellular wireless communication system 1, it is configured to have a plurality of layers.

The network nodes $20_{-i}$ suitably send distribution requests of information from the terminal stations $30_{-j}$ to the contents server 10 and distribute information from the contents server 10 to the terminal stations $30_{-j}$.

The terminal stations $30_{-j}$ are terminal apparatuses comprised of cellular phones in the cellular wireless communication system 1 of the present embodiment. They are used by users for requesting distribution of information from the contents server 10 and performing mutual communication.

Figure 4:
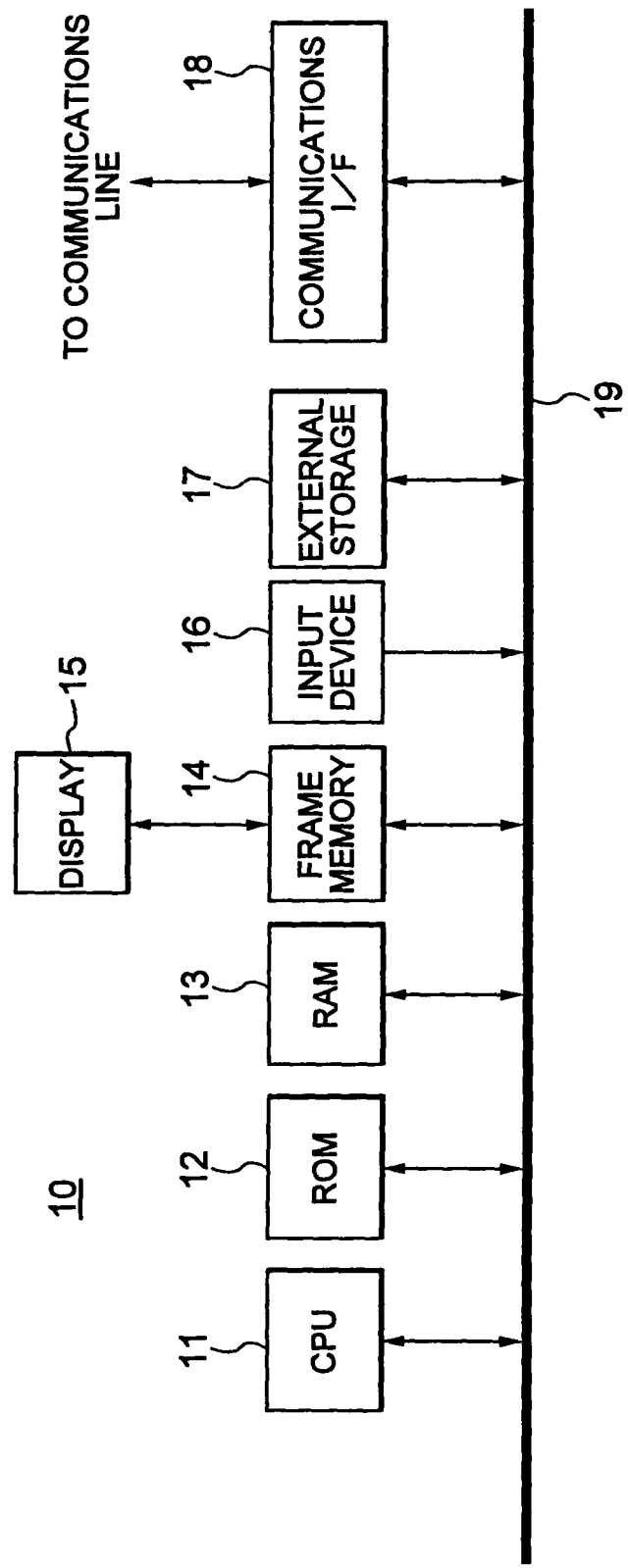
FIG. 4 is a block diagram of the configuration of a contents server of the cellular wireless communication system shown in FIG. 3.

FIG. 4 is a block diagram of the configuration of the contents server 10.

The contents server 10 is comprised of a CPU (central processing unit) 11, ROM (read only memory) 12, RAM (random access memory) 13, frame memory 14, display 15, input device 16, external storage 17, communications I/F (interface) 18, and bus 19.

The CPU 11 controls the contents server 10 based on a processing program stored in the ROM 12.

The ROM 12 has a processing program for processing in the CPU 11. It stores a processing program in accordance with the information distribution routine explained below. The processing program is comprised of control instructions for processing for judging if a request for information content has been received from a terminal station $30_{-j}$ based on that request, processing for generating a response to the terminal $30_{-j}$ based on the result of judgment, processing for scheduling distribution of the information contents, processing for distributing the information contents to the terminal $30_{-j}$, processing for charging the terminal station $30_{-j}$ along with the distribution of information, etc.

The RAM 13 stores temporary processing data when the CPU 11 is processing.

The frame memory 14 stores the display data processed at the CPU 11. The display 15 is an apparatus for displaying the display data stored in the frame memory 14 and provides the necessary information to the manager of the contents server 10. The input device 16 inputs necessary information from the manager of the contents server 10.

The external storage 17 is a randomly accessible information storage medium such as a magnetic disk or optical disk and stores a plurality of information contents.

The communications I/F 18 is a communications interface for connecting the contents server 10 to the network $20_{-j}$ through a communications line and connecting it to the terminal stations $30_{-j}$ through the network $20_{-j}$. The contents server 10 transmits information contents and various control signals to the terminal stations $30_{-j}$ using the communications I/F 18.

The bus 19 connects circuits comprising the above contents server 10 for the transmission of programs or data.

Note that the processing program of the present embodiment was comprised to be stored in the ROM 12, but may also be stored in the external storage 17 and be transferred through the bus 19 to the RAM 13 at the time of execution for execution by the CPU 11. Further, the communication I/F 18 may be comprised to be able to transmit and receive signals. The processing program may be received through a transmission line from an external terminal apparatus at the communication I/F 18, stored in the RAM 13 or external storage 17, and executed at the CPU 11.

That is, the contents server 10 may be loaded with the computer program for performing the above processing from a medium comprised of a magnetic disk, CD-ROM, or other information storage medium and also load it through the Internet, digital satellite, or other transmission medium for processing at the CPU 11.

Figure 5:
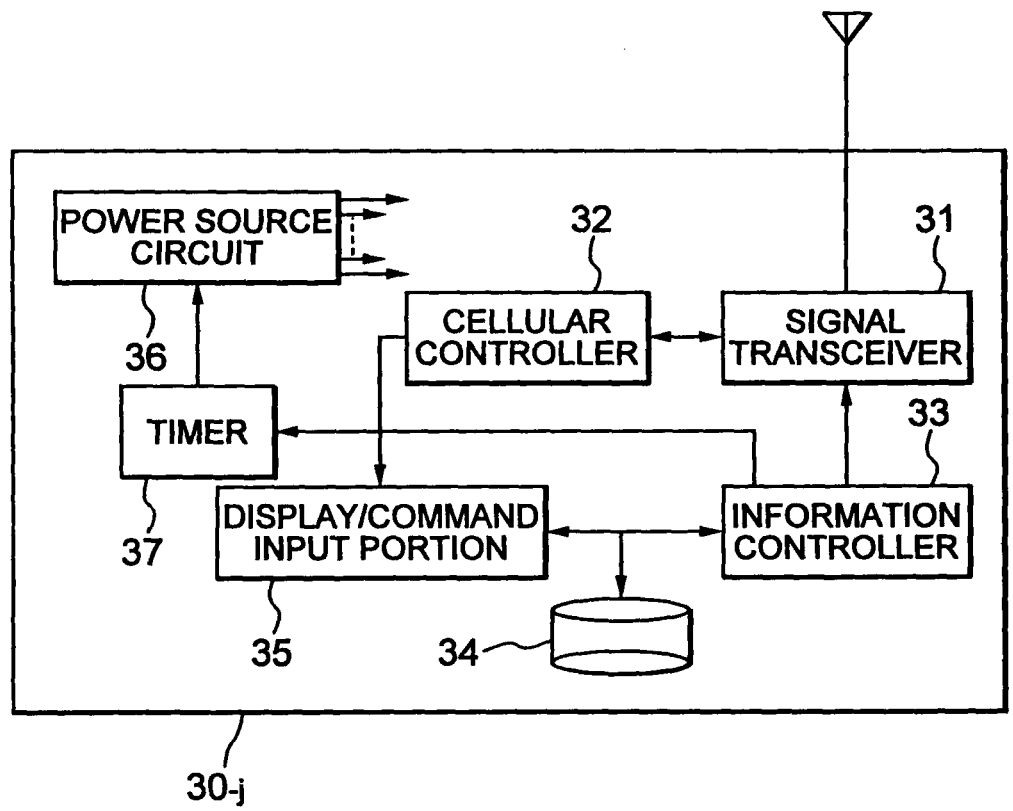
FIG. 5 is a block diagram of the configuration of a terminal station of the cellular wireless communication system shown in FIG. 3.

FIG. 5 is a block diagram of the configuration of a terminal apparatus $30_{-j}$.

A terminal station $30_{-j}$ comprises a signal transceiver 31, a cellular controller 32, an information controller 33, a storage 34, a display/command input portion 35, a power supply circuit 36, and a timer 37.

The signal transceiver 31 is a circuit for performing signal processing for communicating with a base station and generates and sends a communication signal of a desired protocol based on control by the cellular controller 32. Further, the transceiver decodes the received signal to a predetermined base band signal and outputs it to the information controller 33 under the control of the cellular controller 32.

The cellular controller 32 controls the signal transceiver 31 so as that the terminal stations $30_{-j}$ can suitably communicate in accordance with a predetermined protocol or supports the parts of the terminal stations $30_{-j}$ so as to be able to suitably maintain the conditions of the terminal stations $30_{-j}$ relating to the communication by functions provided to the communication system. For example, the cellular controller 32 detects whether or not a terminal station $30_{-j}$ is in an area able to communicate with the base station, namely, performs processing for detecting whether it is within a communication zone or outside the communication zone and outputting the results to the display/command input portion 35.

The information controller 33 performs desired processing on information received via the signal transceiver 31 and information set by a user via the display/command input portion 35.

The information controller 33 generates data requesting distribution of desired information based on user operation and outputs it to the signal transceiver 31.

Also, the information controller 33 stores a variety of notice information etc. received from the contents server 10 in the storage 34 in accordance with need and displays it on the display/command input portion 35 so that a user can confirm it. The information of the scheduled point of time of distribution from the contents server 10 for an information distribution request transmitted to the contents server 10, the communication costs by region/by time bands suitably distributed from the contents server 10, and other data are stored in the storage 34 and displayed at the display/command input portion 35.

Further, the information controller 33 stores the information distributed from the contents server 10 to the storage 34, notifies a user that the information was received via the display/command input portion 35, and, based on an operation of the user, successively reads the information from the storage 34 and displays it at the display/command input portion 35.

Furthermore, when a scheduled period of time of distribution of the information is transmitted from the contents server 10 and the power supply of a terminal station $30_{-j}$ is turned off at the scheduled period of time, the information controller 33 sets a scheduled period of time to the timer 37 so that the power supply automatically turns on.

The storage 34 is a compact storage storing a variety of information notified or distributed by the contents server 10, information set by a user via the display/command input portion 35, etc. and is suitably accessed by the information controller 33. Specifically, the storage 34 is realized by a compact hard disk drive (HDD), an MD, a re-writeable CD, compact MO, flash memory, etc.

The display/command input portion 35 is an interface between an internal circuit of the terminal station $30_{-j}$ and a user and comprises a liquid crystal display panel for displaying information for the user, a speaker for outputting the information by audio, and a key board for the user to operate.

The power supply circuit 36 is a circuit for supplying power to the portions of a terminal station $30_{-j}$.

Usually, the supply and cut-off of power by the power supply circuit 36 is performed directly by the user via the display/command input portion 35, however, the power supply circuit 36 of the present embodiment may be operated to supply and cut-off the power also by a signal from the timer 37. As a result, functions of automatic supply of power at the scheduled period of time of distribution of information from the contents server 10 and automatic cut-off of the power after receiving information are realized.

The timer 37 is a timing means for constantly measuring the time and outputs a control signal for the automatic supply and cut-off of power at the power supply circuit 36 based on a time set by the information controller 33.

Next, the operation of such a cellular wireless communication system 1 and the actual procedure of information distribution will be explained.

Figure 6:
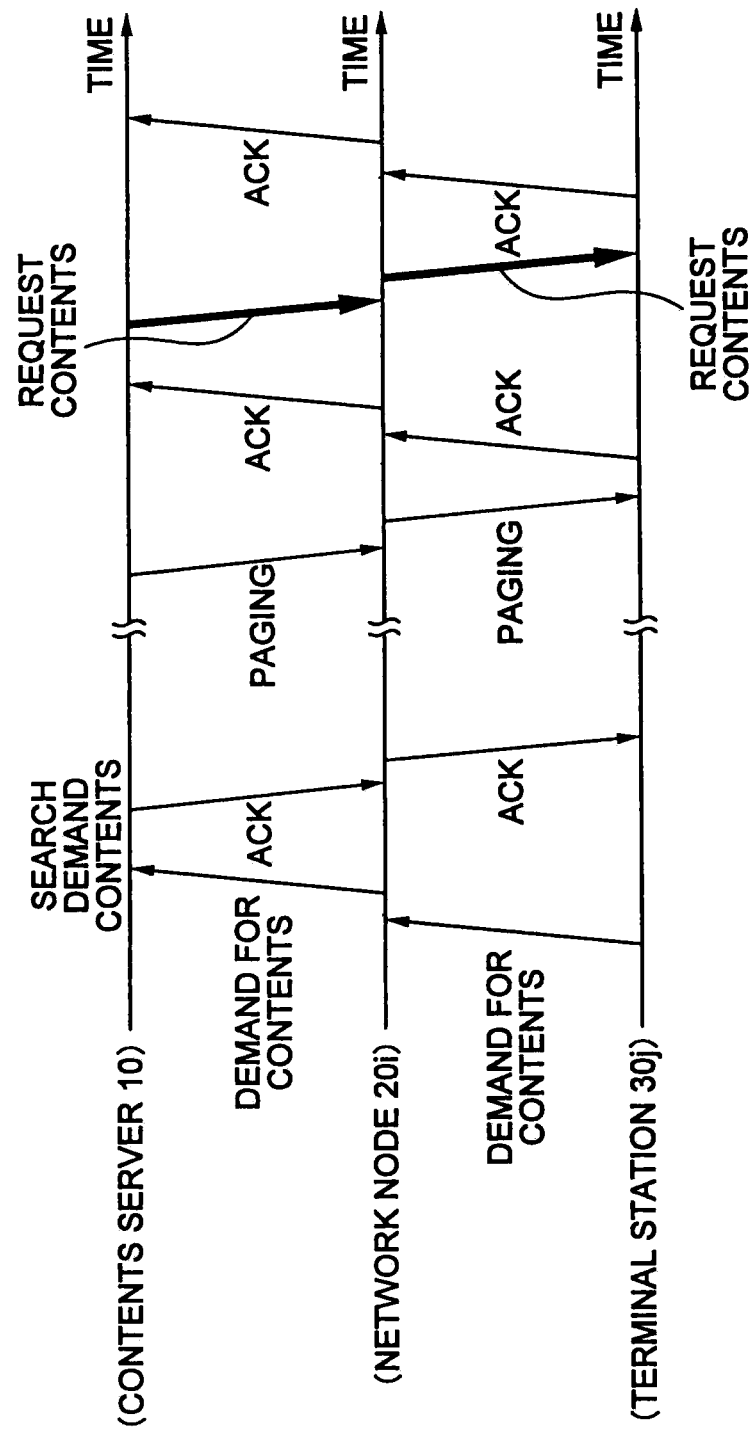
FIG. 6 is a view of a basic procedure of information distribution in the cellular wireless communication system shown in FIG. 3.

FIG. 6 shows a basic procedure of information distribution in the present invention.

A terminal station $30_{-j}$ transmits information for demanding distribution of certain information contents to the contents server 10 (demand for contents). The information includes, in addition to terminal information including an ID for specifying the terminal station $30_{-j}$ and demanded content information expressing the content of the information contents requested, time limit information expressing the deadline for distribution of the information, that is, the time limit of distribution. The request information is transferred to the contents server 10 via a network node (CS) 20.

The contents server 10 receives the request information transmitted from the terminal station $30_{-j}$, verifies the terminal station $30_{-j}$ and, when completes this normally, checks whether or not the requested information can be distributed under the demanded conditions. That is, it judges if it has the requested information contents and judges if it can distribute the information contents by the time indicated by the time limit for distribution.

Then, when the requested information is able to be provided, the terminal station $30_{-j}$ is notified that the demand was received (ACK).

Next, the contents server 10 estimates the time band where the traffic load is small in the communication system in the period until the deadline of the information distribution in the demand and again pages the terminal station $30_{-j}$ requesting the distribution of the information contents. If the terminal station $30_{-j}$ is in a state able to receive the information contents (ACK), it transmits the requested information contents via the network node $20_{-i}$ to the terminal station $30_{-j}$.

When the terminal station $30_{-j}$ normally completes reception of the information contents, it transmits an acknowledgment to the effect of completing the reception (ACK) to the contents server 10, whereby all procedures of transmission and reception end.

Second Embodiment

Several modes of information distribution will be explained next.

First, a mode where the contents server 10 notifies the terminal servers $30_{-j}$ in advance of the time band for transfer of information contents as explained above will be explained.

In this case, the ACK signal sent from the contents server 10 to a terminal server $30_{-j}$ for a demand for information distribution includes information of the time band during which the contents server 10 will transmit the information contents to the terminal station $30_{-j}$ demanding distribution.

The contents server 10 which received the demand for information distribution from the terminal station $30_{-j}$ calculates the time band estimated to have less communications traffic during the time until the informed deadline based on results of operations up to then and the transmission schedule of the information contents received until then. Then, it includes the information of the scheduled point of time of distribution determined based on the calculated time band in the above ACK.

By the transfer of the ACK to the terminal station $30_{-j}$, it is possible for the terminal station $30_{-j}$ to learn when the information will be distributed.

The terminal station $30_{-j}$ displays the point of time scheduled for distribution of the information contents to the user and makes the user prepare for receiving the information contents during the time band.

Then, the contents server 10 again pages the terminal station $30_{-j}$ at the point of time notified in advance to the terminal station $30_{-j}$ and distributes the information contents by the above procedure.

In the above mode of transfer of information contents, the power supply of the terminal station $30_{-j}$ may be controlled in accordance with the point of time of transfer of the information contents.

A terminal station $30_{-j}$ is provided internally with a timer 37 which is constantly in operation even when the power supply of the terminal station $30_{-j}$ is turned off.

Therefore, when the power supply of the terminal station $30_{-j}$ is turned off at the scheduled point of time of distribution of the information contents notified by the contents server 10, the timer 37 outputs a trigger signal to the power supply circuit 36 to automatically turn on the power supply of the terminal station $30_{-j}$ and give the initial settings required for receiving the information contents transmitted from the contents server 10.

The contents server 10 transmits in the same way as the above the information contents demanded to be distributed to the terminal station $30_{-j}$ when the point of time notified in advance arrives, so the terminal station $30_{-j}$ receives the same.

By configuring the terminal station in the above way, it becomes possible to turn off the power supply in usual times to keep down the power consumption and to automatically turn it on at the scheduled point of time of distribution of the information contents.

Further, the terminal station $30_{-j}$ may be configured to automatically turn off again when normally completing the reception of the information contents scheduled to be distributed.

Third Embodiment

Next, a mode of receiving information contents by a user designating a time band and region will be explained.

First, the contents server 10 or the network node $20_{-i}$ averages and calculates the traffic load in the past for different regions in advance. For example, it sets the relay area of a network node $20_{-}$, as a calculated region. Alternatively, it sets an area comprised by relay areas of several network nodes $20_{-}$, as the calculated region. Then, the contents server 10 or the network node $20_{-i}$ suitably predicts a traffic load by region and by time band based on the schedule of distributing the information contents scheduled until then and calculation of the traffic load and, based on this prediction, calculates communication fees for the respective regions/time bands.

The communication fees for each region/time band are broadcasted to the terminal stations $30_{-1}$ to $30_{-m}$ using a BCCH (broadcast control channel) for simultaneous broadcast of control signals from a base station to terminal stations in cellular wireless communications.

The terminal stations $30_{-j}$ suitably receive the information of the communication fees for each region/time band and store it in the storage 34 when performing processing (such as cell searching) necessary for connecting with the network.

Then, they display the information relating to the communication charges on the display/command input portion 35 when a user inputs an instruction to the effect of desiring to demand distribution of information contents etc. from the display/command input portion 35.

When an instruction of "in which time band and region the reception of the information contents is desired" is input by a user through the display/command input portion 35, a terminal station $30_{-j}$ generates region/time band information based on the input region and time band instruction, adds it to the demand for distribution of information contents, and sends the result to the contents server 10.

The contents server 10 receiving this transmits as ACK by the above procedure to notify the terminal station $30_{-j}$ that the demand was received when the content of the demand for information distribution is acceptable.

Next, the contents server 10 pages the terminal station $30_{-j}$ in the region. and time band designated by the terminal station $30_{-j}$ and transmits the demanded information contents when the terminal $30_{-j}$ responds. That is, it confirms if there is a terminal station $30_{-j}$ existing in the region designated by the user and where there is transmits the information contents to the terminal station $30_{-j}$ through the network node $20_{-i}$ positioned in the designated region.

Note that when the terminal station $30_{-j}$ does not respond to the paging, the contents server 10 tries again several times, then gives up distributing the information contents.

To avoid such giving up of distribution of the information contents as much as possible, information indicating a plurality of candidates for "in which time band and region reception of information contents is desired" transmitted from a terminal station $30_{-j}$ to the contents server 10 may be also set. Further, priority may be added as well to the thus set plurality of candidates.

In this case, it is sufficient that the contents server 10 distribute the information contents in one of the region/time band among the candidates. Specifically, the contents server 10 tries to distribute the information contents for example from the one having the earliest time band among the candidates. When the candidate time bands are the same, it tries to distribute the information contents from the ones having the higher priorities.

Further, when the terminal station $30_{-j}$ does not respond to the paging in the designated region in the designated time band, the contents server 10, as a next stage, may refer to an HLR (home location register) storing information of the terminal stations $30_{-j}$ provided in the cellular wireless communications system 1 and page a region where the terminal station $30_{-j}$ is considered to exist. In this case, when the terminal station $30_{-j}$ responds to the paging, a fee is charged for the traffic load of that region/time band.

Note that the paging referring to the HLR may also be performed without paging in the designated region.

Fourth Embodiment

Next, a mode will be explained where at the time of the above information distribution, a charge for the distribution of the same information is changed in accordance with time limit of distribution.

A terminal station $30_{-j}$ is comprised to be able to select one of the time limits of distribution of "receive distribution of information immediately" and "receive distribution of information before deadline" when sending a demand for distribution of information contents to the contents server 10.

When distribution of information is demanded immediately, the contents server 10 judges whether the demand is "OK" or "NG" by considering the current traffic load. When "OK", it sends the terminal station $30_{-j}$ ACK, while when "NG", it sends NACK.

When OK, the server immediately secures a communication line and distributes the information contents by using the existing method.

When NG, the server distributes NACK to notify that the information distribution is currently not possible. In response to this, the user sets an acceptable period of time etc. of the information distribution as a distribution time limit and issues a request for information distribution again.

In this case, the communication fee for the information distribution is determined by the period of time until the deadline of the information distribution.

Namely, the fee related to the distribution is the highest when the information is distributed immediately and becomes lower the later the information distribution time.

As explained above, according to the cellular wireless communication system 1 of the present invention, since it becomes possible not to provide information by real-time the distribution of information content can be scheduled for any period of time until the time limit for distribution, the traffic load in the time bands where the traffic load is high can be out and the traffic load in time bands scarcely used before can be increased, so it becomes possible to obtain the effects of averaging the traffic load in terms of time and to effectively utilize communication facilities owned by a network operator fully for 24 hours as shown in FIG. 7.

Note that in FIG. 7, the traffic load shown by a thick line is a part indicating the traffic load of the communication system according to the present invention.

Also, due to this, since the network operator can much more effectively utilize the communication facilities, it becomes possible to lower the traffic load at peak times and reduce the communication costs.

Also, users of terminal stations become able to decide the deadline for information distribution by themselves.

Namely, it becomes possible to finalize the point of time for information distribution in a user-led manner. As a result, it becomes possible for a user to receive information contents at the desired period of time at a reasonable communication cost by considering the point of time for information distribution and the communication charges necessary for the information distribution.

Note that the present invention is not limited to the embodiments and may be modified in various ways.

For example, the configurations of the terminal stations $30_{-j}$ etc. are not limited to above examples. Any configurations are possible.

For example, as a modification according to the present invention, the terminal station $30_{-j}$ may estimate the size of the information contents desired by a user and calculate and display to the user by about how much time and communication charge reception of the information contents would be possible from the size of the contents and a communications capacity able to be provided by the current system. Note that the size of the information contents may be estimated independently by the terminal station $30_{-j}$ in some cases, or the size of the information contents desired by the user may be obtained after demanding the contents server 10 notify the size of the information contents in other cases.

Further, in the cellular wireless communication system 1, the contents server 10 or the network nodes $20_{-i}$ may inform users through the BCCH of up to how much a load of communications can be provided at the present in the region, and the terminal stations $30_{-j}$ may receive the information constantly and store it in a built-in storage for display to the users.

In addition, the configuration of the display/command input portion 35 was made a liquid crystal panel, a speaker, and a key board in the present embodiment, however, the portion may be configured, for example, without a key board and to comprise other any input/output means.

Also, the configuration of the storage 34 may use a recording device for recording information on any recording medium other than the above recording media and recording devices such as HD, MD, MO, CD, etc.

Also, the above embodiment was explained taking as an example the case where the configuration of a network was a cellular wireless communication system, however, the present invention is not limited to this and is able to be applied to any network systems.

Also, in the network of the present embodiment, only one contents server was shown, however, two or more servers may exist as in usual cases. Also, the configuration of the network is not limited to the form in the above embodiment where a contents server, network nodes, and terminal stations are connected in a tree-structure. It may be any form of network.

As explained above, according to the embodiments of the present invention, an information distribution system and method capable of averaging a traffic load over time and effectively utilizing communication facilities can be provided.

Also, a terminal apparatus, a server apparatus, a data reception method, and a data transmission method able to be used in such an information distribution system and to contribute to averaging of the traffic load in the network and effective usage of communication facilities can be provided.

INDUSTRIAL APPLICABILITY

The present invention can be applied to various network systems such as cellular wireless communication systems.

The invention claimed is:

1. An information processing apparatus for scheduling information distribution, comprising:
a receiving unit configured to receive a request signal from a terminal apparatus, the request signal including scheduling criteria defined at the terminal apparatus;
a scheduling unit configured to conduct automatic distribution scheduling based on:
the scheduling criteria received at the receiving unit, wherein the scheduling criteria include a deadline defining an end of an otherwise unlimited period of time during which information distribution to the terminal apparatus is requested, and
at least one off-peak hour and communication cost that are related to one of a plurality of available communication systems,
wherein the automatic distribution scheduling comprises averaging traffic load over time by increasing the traffic load in the at least one off-peak hour and reducing the traffic load in at least one peak hour by automatically scheduling the information distribution to the terminal apparatus during the otherwise unlimited period of time; and
a confirmation signal transmitting unit configured to transmit a confirmation signal to the terminal apparatus in response to the received request signal.

2. The information processing apparatus of claim 1, wherein:
the confirmation signal includes notice information related to information distribution.

3. The information processing apparatus of claim 1, wherein the confirmation signal includes scheduling information regarding the distribution scheduling conducted by the scheduling unit.

4. The information processing apparatus of claim 1, wherein the request signal further includes contents related information the terminal apparatus requested.

5. The information processing apparatus of claim 1, wherein the request signal further includes terminal related information of the terminal apparatus.

6. The information processing apparatus of claim 1, wherein the scheduling criteria and the deadline for information distribution to the terminal apparatus are defined by a user of the terminal apparatus.

7. The information processing apparatus of claim 1, wherein the deadline for information distribution to the terminal apparatus comprises a time limit of information distribution to the terminal apparatus.

8. The information processing apparatus of claim 7, wherein the time limit of information distribution to the terminal apparatus is a time before which information distribution to the terminal apparatus must occur.

9. The information processing apparatus of claim 1, wherein the scheduling criteria include area information.

10. The information processing apparatus of claim 1, wherein:
the scheduling unit is configured to conduct the distribution scheduling by calculating the at least one off-peak hour, and
the at least one off-peak hour and communication cost are related to at least one available cellular wireless communication system.

11. An information processing apparatus to control scheduling for information distribution, comprising:
a processor; and a memory storing computer-executable instructions, which when executed by the processor cause the processor to:
receive a request signal from a terminal apparatus, the request signal including scheduling criteria defined at the terminal apparatus;
conduct distribution scheduling automatically based on:
the scheduling criteria received, wherein the scheduling criteria include a deadline defining an end of an otherwise unlimited period of time during which information distribution to the terminal apparatus is requested, and
at least one off-peak hour and communication cost that are related to one of a plurality of available communication systems,
wherein the distribution scheduling comprises averaging traffic load over time by increasing the traffic load in the at least one off-peak hour and reducing the traffic load in at least one peak hour by automatically scheduling the information distribution to the terminal apparatus during the otherwise unlimited period of time; and
transmit a confirmation signal to the terminal apparatus in response to the received request signal.

12. The information processing apparatus of claim 11, wherein the deadline for information distribution to the terminal apparatus comprises a time limit of information distribution to the terminal apparatus, and the time limit of information distribution is a time before which information distribution to the terminal apparatus must occur.

13. An information processing method to control scheduling for information distribution, the method comprising:
receiving a request signal from a terminal apparatus, the request signal including scheduling criteria defined at the terminal apparatus;
automatically scheduling distribution based on:
the scheduling criteria received, wherein the scheduling criteria include a deadline defining an end of an otherwise unlimited period of time during which information distribution to the terminal apparatus is requested, and
at least one off-peak hour and communication cost that are related to one of a plurality of available communication systems,
wherein scheduling distribution comprises averaging traffic load over time by increasing the traffic load in the at least one off-peak hour and reducing the traffic load in at least one peak hour by automatically scheduling the information distribution to the terminal apparatus during the otherwise unlimited period of time; and
transmitting a confirmation signal to the terminal apparatus in response to the received request signal.

14. A terminal apparatus comprising:
a transmitting unit configured to transmit a request signal to a server system, the request signal including scheduling criteria defined at the terminal apparatus; and
a scheduling information receiving unit configured to receive scheduling information automatically generated based on:
the scheduling criteria, wherein the scheduling criteria include a deadline defining an end of an otherwise unlimited period of time during which information distribution to the terminal apparatus is requested, and
at least one off-peak hour and communication cost that are related to one of a plurality of available communication systems,
wherein the scheduling information is automatically generated by averaging traffic load over time by increasing the traffic load in the at least one off-peak hour and reducing the traffic load in at least one peak hour by automatically scheduling the information distribution to the terminal apparatus during the otherwise unlimited period of time,
wherein the scheduling information includes notice information related to information distribution.

15. The terminal apparatus of claim 14, further comprising:
a power controlling unit configured to control a power of the terminal apparatus according to the scheduling information.

16. The terminal apparatus of claim 15, wherein the power controlling unit is configured to turn the power on at an indicated time in the scheduling information.

17. The terminal apparatus of claim 15, wherein the power controlling unit is configured to turn the power off in response to the terminal device completing receiving of the scheduling information.

18. The terminal apparatus of claim 14, wherein:
the scheduling information is generated using a calculation of the off-peak hour, and
the at least one off-peak hour and communication cost are related to at least one available cellular wireless communication system.

19. An information processing apparatus included in a terminal apparatus, comprising:
a processor; and
a memory storing computer-executable instructions, which when executed by the processor cause the processor to:
transmit a request signal to a server system, the request signal including scheduling criteria defined at the terminal apparatus; and
receive scheduling information automatically generated based on:
the scheduling criteria, wherein the scheduling criteria include a deadline defining an end of an otherwise unlimited period of time during which information distribution to the terminal apparatus is requested, and
at least one off-peak hour and communication cost that are related to one of a plurality of available communication systems,
wherein the scheduling information is automatically generated by averaging traffic load over time by increasing the traffic load in the at least one off-peak hour and reducing the traffic load in at least one peak hour by automatically scheduling the information distribution to the terminal apparatus during the otherwise unlimited period of time,
wherein the scheduling information includes notice information related to information distribution.

20. An information processing method for a terminal apparatus, the method comprising:
transmitting a request signal to a server system, the request signal including scheduling criteria defined at the terminal apparatus; and
receiving scheduling information automatically generated based on:

the scheduling criteria, wherein the scheduling criteria include a deadline defining an end of an otherwise unlimited period of time during which information distribution to the terminal apparatus is requested, and at least one off-peak hour and communication cost that are related to one of a plurality of available communication systems, wherein the scheduling information is automatically generated by averaging traffic load over time by increasing the traffic load in the at least one off-peak hour and reducing the traffic load in at least one peak hour by automatically scheduling the information distribution to the terminal apparatus during the otherwise unlimited period of time, wherein the scheduling information includes notice information related to information distribution.

\* \* \* \* \*